Patented Feb. 26, 1924.

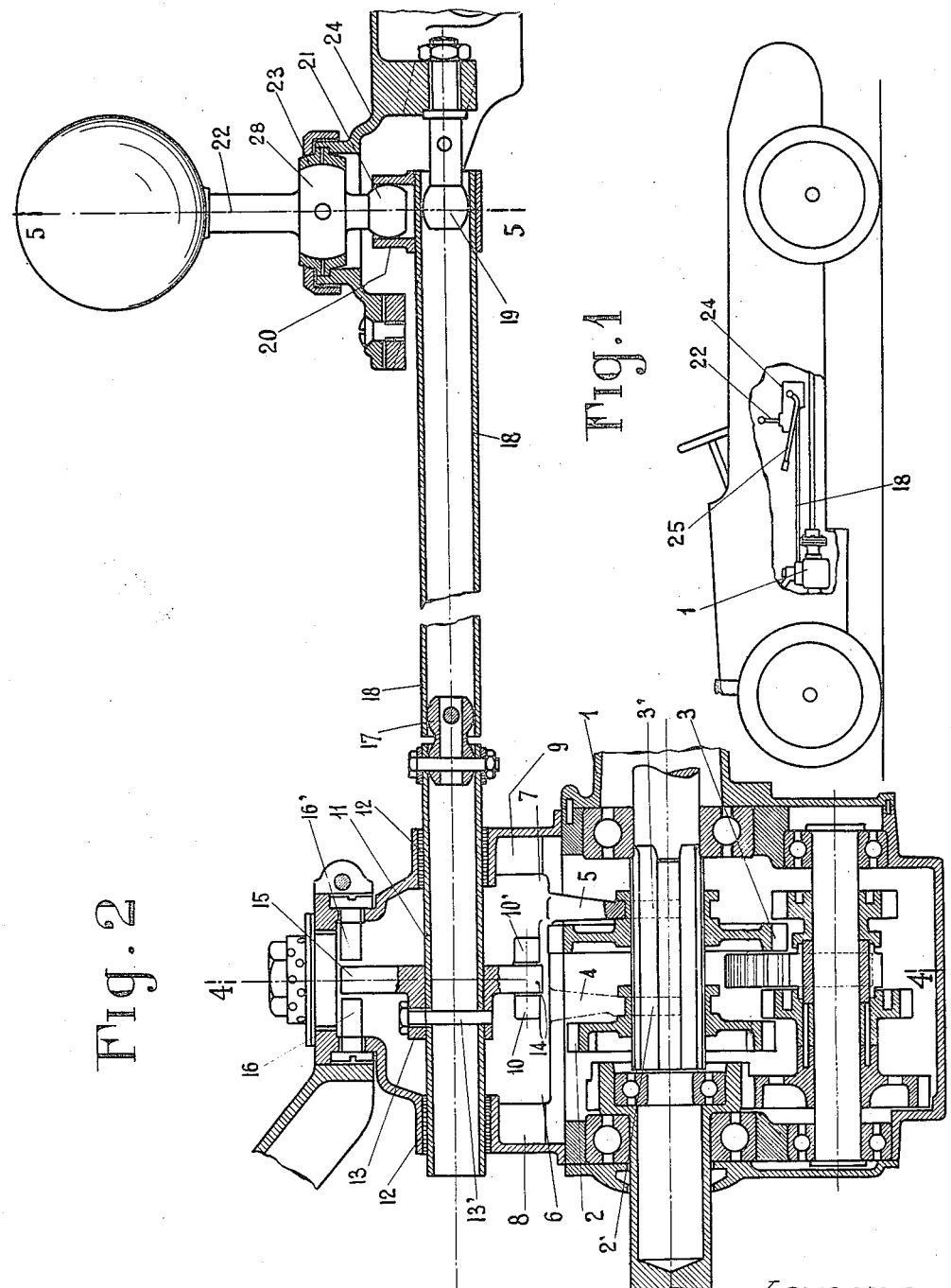

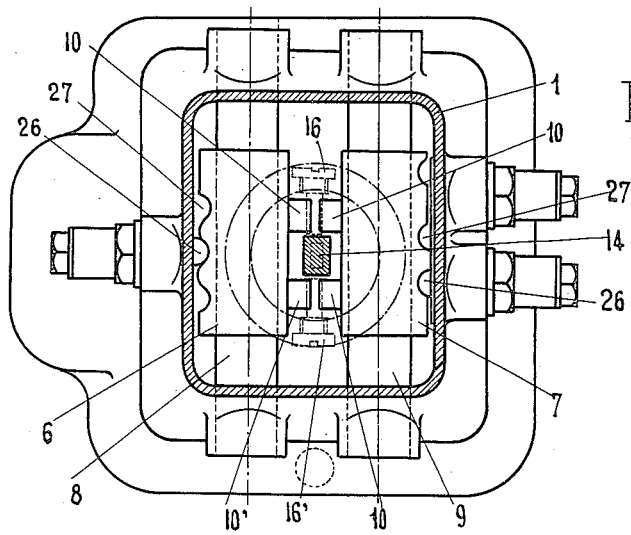
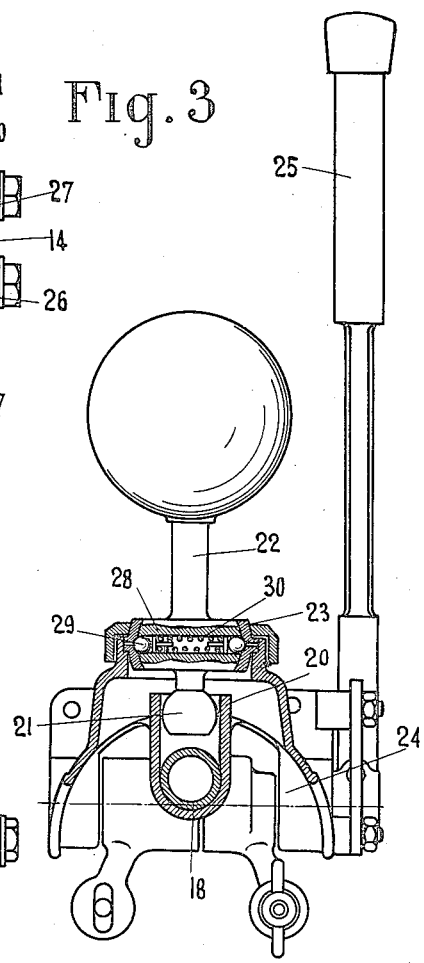
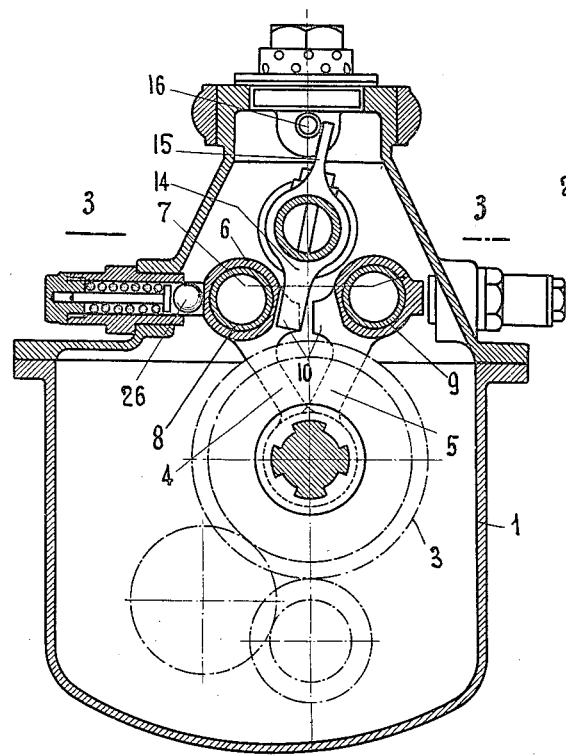

1,485,278

UNITED STATES PATENT OFFICE.

VINCENZO LANCIA, OF TURIN, ITALY.

CHANGE-SPEED GEAR.

Application filed December 14, 1922. Serial No. 606,947.

*To all whom it may concern:*

Be it known that I, VINCENZO LANCIA, a subject of the King of Italy, residing at Turin, Italy, have invented new and useful Improvements in Change-Speed Gears; and I do hereby declare the following to be a full, clear, and exact description of the same.

The present invention relates to change speed gears of the kind comprising a plurality of sliding pinions, particularly for motor cars and similar appliances, and has for its object an arrangement for the control of said sliding pinions when the change speed gear is arranged at a distance from its control lever.

The control device of the change speed gear according to this invention comprises a spindle mounted to oscillate and to move longitudinally, which is provided with a member adapted to engage either of a set of forks each shifting one of the sliding pinions.

This invention provides also means for properly locking the control member against undue movements.

On the annexed drawing is shown an embodiment of the present invention, and Figure 1 is a general view of a motor car showing the respective position of the change speed gear and of its control lever; Figure 2 is a fragmentary sectional view at a larger scale taken along the axis of the controlling spindle; Figure 3 is a fragmentary section on line 3—3 of Figure 4; Figure 4 is a section on line 4—4 of Figure 2; Figure 5 is a section of the actuating device on line 5—5 of Figure 2.

In said drawing, 1 is the change speed gear box fastened on the vehicle frame and comprising driving and driven shafts with their respective pinions.

Sliding pinions 2 and 3 are provided to mesh with the pinions of the change speed gear for the purpose of producing the transmission under the desired ratio; each of these sliding pinions 2 and 3 is provided with a grooved collar 2'—3' respectively engaged by a fork 4—5 each solid with a sleeve 6—7 respectively mounted to slide along a spindle 8—9 secured in the box 1; suitable stops as spring pressed balls 26 are provided to engage notches 27 of said sleeves to lock them in the desired position. Each of said sleeves is provided with a pair of projections 10 providing an intermediate recess adapted to be engaged by an actuating part for the purpose of shifting said sliding pinion.

Intermediate the spindles 8 and 9 and parallel therewith is arranged a spindle 11 mounted to move angularly and longitudinally in bushings 12 provided in the box 1, and on said spindle is fastened by a bolt 13' a sleeve 13 having two teeth 14 and 15 respectively. The tooth 14 is adapted to enter either of the recesses provided between the projections 10 of the sleeves 6 and 7 to engage either of these sleeves, while the tooth 15 has such a size and position as to be engaged between the ends of stationary concentric pins 16—16', fastened on the box 1, when the sleeve 13 is in its intermediate position shown by Figures 2 and 3 in which both pinions 2 and 3 are out of mesh with the associate ones and the tooth 14 is in its intermediate position with respect to recesses of the sleeves 6 and 7. (Figure 3). Said tooth 15 clears said pins 16—16' and then it may slide along either the side of either of them as soon as the sleeve 13 and tooth 14 are oscillated to carry this tooth 14 into engagement with either of the sleeves 6—7.

The control spindle 11 is actuated by means of a shaft 18 connected with said spindle by means of a double ball joint 17; said shaft 18 is mounted to slide on a stationary ball support 19 carried by a member 24 of the vehicle frame and has a socket 20 engaged by a ball head 21 which is carried by an actuating lever 22 which floats in a socket 23 by means of its ball pivot 28; said socket 23 is carried by the frame member 24 on which is also mounted as usually a lever 25 intended to operate the brake gear not shown.

In said pivot 28 are located ball stops 29 pressed by a spring 30 to engage recesses of the socket for resiliently keeping the lever 22 in its ordinary position.

The operation is as follows: When the parts are in the position of Figures 2 and 3, both pinions 2 and 3 are in inoperative position and the tooth 15 of the sleeve 13 is engaged between the pinions 16—16'. By oscillating the lever 22 in a direction transverse to the axis of the shaft 18, this shaft is oscillated by the cooperation of the ball head 21 with the socket 20 of the shaft 18, and the spindle 11 with teeth 14—15 are similarly oscillated, the tooth 14 engaging either of the sleeves 6 or 7 while the tooth 15 clears the pins 16—16'. In Figure 4 the tooth 14 is assumed to have been carried into engagement with the sleeve 6 solid with the fork 4 and shifting the pinion 2.

Then the lever 22 is rocked in a plane parallel with the axis of the shaft 18 and this latter is moved longitudinally with the spindle 11, sleeve 13, tooth 14, either of sleeves 6 or 7 engaged therewith, to carry the pinion shifted by the engaged sleeve in the desired position.

In this operation the spindle 11 and lever 22 cannot be unduly oscillated because the tooth 15 runs along one of the pins 16—16' and prevents any undue operation.

For carrying the parts in the position of Figure 2 preparatory to a new operation, the lever 22 is rocked to first shift the spindle 11 longitudinally and then angularly.

This invention provides a simple arrangement by which the change speed gear may be arranged at a distance from its controlling lever which in motor cars must be located in a well defined position while the change speed gear may be required to be located at a point distant from the driver seat and actuating lever.

Attention is called to my other patents and patent applications in respect of the features illustrated in this application but not claimed per se.

What I claim as my invention and desire to secure by United States Letters Patent is:—

1. In a change speed gear comprising a plurality of slidable pinions, supports parallel with the axis of said pinions, members mounted to slide along said supports each member engaging one of said pinions to shift it and having a recess, a control part mounted to oscillate and move longitudinally along an axis parallel with said supports, a finger on said control part adapted to engage the recess of either of said members, pins mounted in the gear casing and parallel with said supports, these pins having their ends in front of and spaced from each other, a tooth on said control part which is engaged between the ends of said pins when said finger is not in engagement with either of said recesses and slides along the same pins after said finger has been engaged with the recess of either of said members and moved longitudinally to shift the same member and its associate slidable pinion.

2. In a change speed gear comprising a plurality of slidable pinions, slidable parts shifting said pinions, a member mounted to move longitudinally and angularly in the gear casing, a shaft flexibly connected with said member, means for slidably and rotatably supporting said shaft, a floating lever and a support therefor, and means interconnecting said floating lever and shaft to shift this latter by the operation of the said lever.

3. In a change speed gear comprising a plurality of slidable pinions, slidable parts shifting said pinions, a member mounted to move longitudinally and angularly in the gear casing, a tubular shaft flexibly connected with said member, a ball headed support entering said shaft, a floating lever and a support therefor, and means interconnecting said floating lever and shaft to shift this latter by the operation of said lever.

4. In a change speed gear comprising a plurality of slidable pinions, slidable parts shifting said pinions, a member mounted to move longitudinally and angularly in the gear casing, a shaft flexibly connected with said member, a lever having a ball pivot, a ball-socket for said pivot, means for locking said pivot and lever in position with respect to said socket, and cooperating ball and socket on said lever and shaft for shifting and oscillating this latter and said member by the manipulation of the lever.

In testimony whereof, I have signed my name to this specification.

VINCENZO LANCIA.